(12) United States Patent
Hedley et al.

(10) Patent No.: US 7,677,582 B2
(45) Date of Patent: Mar. 16, 2010

(54) VEHICULAR COMPONENT APPARATUS

(75) Inventors: Robert Ian Hedley, Milbrodale (AU); Christopher Nash Whybin, Newstead (AU)

(73) Assignee: Justoy Pty Ltd., Mt. Thorley via Singleton (AU)

( * ) Notice: Subject to any disclaimer, the term of this patent is extended or adjusted under 35 U.S.C. 154(b) by 107 days.

(21) Appl. No.: 11/804,584

(22) Filed: May 17, 2007

(65) Prior Publication Data

US 2007/0290179 A1 Dec. 20, 2007

(30) Foreign Application Priority Data

May 18, 2006 (AU) .............................. 2006902682

(51) Int. Cl.
*B62B 5/00* (2006.01)
(52) U.S. Cl. ..................... 280/79.4; 280/79.11; 414/429
(58) Field of Classification Search .............. 280/79.11, 280/79.4, 79.3, 79.2, 47.24, 47.35, 655, 47.2; 414/429, 428, 427, 430, 589
See application file for complete search history.

(56) References Cited

U.S. PATENT DOCUMENTS

| 1,399,351 | A | * | 12/1921 | Lee ............................ 280/79.4 |
|---|---|---|---|---|
| 1,964,119 | A | * | 6/1934 | Hendry ........................ 414/427 |
| 2,467,500 | A | * | 4/1949 | Salter .......................... 414/427 |
| 3,145,859 | A | * | 8/1964 | Barosko ....................... 414/427 |
| 3,237,921 | A | * | 3/1966 | Jay ............................. 254/122 |
| 3,749,265 | A | * | 7/1973 | Smith, Jr. ..................... 414/427 |
| 4,460,306 | A | * | 7/1984 | Hawkins ....................... 414/427 |
| 4,872,694 | A | * | 10/1989 | Griesinger ................... 280/79.4 |
| 4,900,215 | A | * | 2/1990 | Nowell ......................... 414/428 |
| 5,044,645 | A | * | 9/1991 | Eltvik ......................... 280/79.4 |
| 5,176,487 | A | * | 1/1993 | Flitton ........................ 414/428 |
| 5,378,004 | A | * | 1/1995 | Gunlock et al. ............. 280/47.2 |
| 5,433,469 | A | * | 7/1995 | Cassels ....................... 280/655 |
| 5,732,960 | A | * | 3/1998 | Elam .......................... 280/79.4 |
| 5,975,543 | A | * | 11/1999 | Mosher et al. ........... 280/47.24 |
| 6,120,042 | A | * | 9/2000 | Mosher et al. ........... 280/47.24 |
| 6,332,620 | B1 | * | 12/2001 | Mosher et al. ........... 280/47.24 |
| 6,382,644 | B1 | * | 5/2002 | Rawlings ................. 280/47.35 |
| 6,773,222 | B1 | * | 8/2004 | Gilchrist ...................... 414/427 |
| 6,846,144 | B2 | * | 1/2005 | Justice ......................... 414/589 |
| 6,860,496 | B2 | * | 3/2005 | Novak et al. .............. 280/79.11 |
| 7,059,616 | B2 | * | 6/2006 | Wu ........................... 280/47.24 |
| 7,097,406 | B1 | * | 8/2006 | Gang .......................... 414/429 |

\* cited by examiner

*Primary Examiner*—Hau V Phan
(74) *Attorney, Agent, or Firm*—McAfee & Taft

(57) ABSTRACT

An apparatus for removing, installing and/or servicing a vehicular component, such as a wheel/tyre, a motor or the like, particularly for large mining and/or earthmoving equipment. The apparatus includes a carrier device (100) and a component handling device (200). The carrier device (100) enables the apparatus to be moved over a substrate surface, and is preferably a U-shaped chassis having a pair of outwardly extending arms (140), and at least three wheels (120, 130). The component handling device (200) is removably coupled to the carrier device (100). The component handling device (200) includes a frame (270) of complementary shape to the chassis to support the lower portion of the vehicular component, and, a support element (210). At least one retaining arm (220) extends from the support element (210) to provide support to an upper end of the vehicular component.

32 Claims, 13 Drawing Sheets

VEHICULAR COMPONENT APPARATUS

FIELD OF INVENTION

The present invention relates to apparatus that facilitates interaction with vehicular components. In one non-limiting form, the present invention relates to apparatus that facilitates interaction with vehicular components for large vehicles, such as those used in the mining industry.

BACKGROUND OF INVENTION

Currently a number of apparatus are required to remove, install, and/or change a vehicular component of a vehicle. For example, a first apparatus may be required to uncouple coupling elements of a vehicular component, another apparatus may be required to receive the vehicular component, and, another apparatus may be required to position a vehicular component for installation. This number of apparatus can be costly, particularly for specialised vehicles such as large vehicles used in such industries as mining and the like.

Furthermore, problems can be experienced whilst removing, installing and/or changing vehicular components for large vehicles which may not be apparent for other forms of vehicular components. For example, large vehicular components pose a serious danger to operators due to the size of components. Injuries and fatalities have occurred due to incorrect handling of such large vehicular components. Furthermore, installing, removing and/or changing such large vehicular components can cause enormous strain of an operator due to the size of such components.

Therefore, there is a need for an apparatus which addresses or at least ameliorates at least some of these problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

SUMMARY OF INVENTION

In one broad form, the present invention provides an apparatus for removing, installing and/or servicing a vehicular component of a vehicle, including:

a carrier device, to move said apparatus over a substrate surface; and, a component handling device, attached to said carrier device, to receive and support said vehicular component.

Preferably, said carrier device includes:

a substantially U-shaped chassis, having a pair of outwardly extending arms extending from an intermediate spine; and a wheel provided substantially at the extremity of each arm, and, an intermediate wheel positioned below said spine.

Also preferably, said carrier device further includes:

an actuator associated with one or more of said wheels, to rotate said respective wheel and thereby effect movement of said carrier device.

Preferably, operation of said actuator(s) is controlled remotely.

Also preferably, said carrier device further includes:

a coupling element associated with said spine of said carrier device, to couple with a coupling member associated with said component handling device, to thereby releasably couple said component handling device to said carrier device.

Also preferably, said coupling element is embodied as a hook, recess or the like, and said coupling member is embodied as a lug or the like, or vice versa.

In a preferred form of the present invention, said component handling device includes:

a frame, of complementary shape to engage with said chassis and which is adapted to provide support to a lower portion of said vehicular component; and a support element extending upwards from said frame, having at least one retaining arm extending outwardly therefrom which is adapted to provide support to an upper portion of said vehicular component;

wherein, said frame, said support element and said at least one retaining arm define a cavity which is able to accommodate said vehicular component.

Preferably, said frame includes a pair of outwardly extending support members each of which are adapted to provide support to either side of a lower portion of said vehicular component.

Also preferably, each support member is connected to said frame via an arm, to permit at least upward movement of said support member.

Also preferably, said movement is effected by a hydraulic, electrical or other actuator.

Preferably, said support member includes a pair of retaining arm(s), each of which is adapted to provide support to either side of an upper portion of said vehicular component.

Also preferably, each retaining arms includes an upper and outer arm portion, at least the outer arm portion being operably movable to be capable of grasping said vehicular component.

Preferably, said vehicular component is a wheel/tyre.

Also preferably, said support elements including rollers thereon, such that when said wheel/tyre is held in said apparatus, said wheel/tyre may be rotated on said rollers within said component handling apparatus.

In another preferred form of the present invention, said component handling device includes:

a frame of complementary shape to engage with said chassis; and, a positionable station, having a platform adapted to support a work tool, and, a positioning mechanism to position said platform to thereby enable operation of said work tool with said vehicular component.

Preferably, said positioning mechanism includes at least one hydraulic ram, electric motor or like device.

Preferably the apparatus further includes a cradle provided on said platform, said cradle adapted to receive a motor or other vehicular component.

In another preferred form of the present invention, said component handling device is embodied as a jig assembly which includes:

a frame of complementary shape to engage with said chassis; and, a jig head, operable by at least one actuator.

Also preferably, said platform is provided with handrails and adapted to support an operator.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
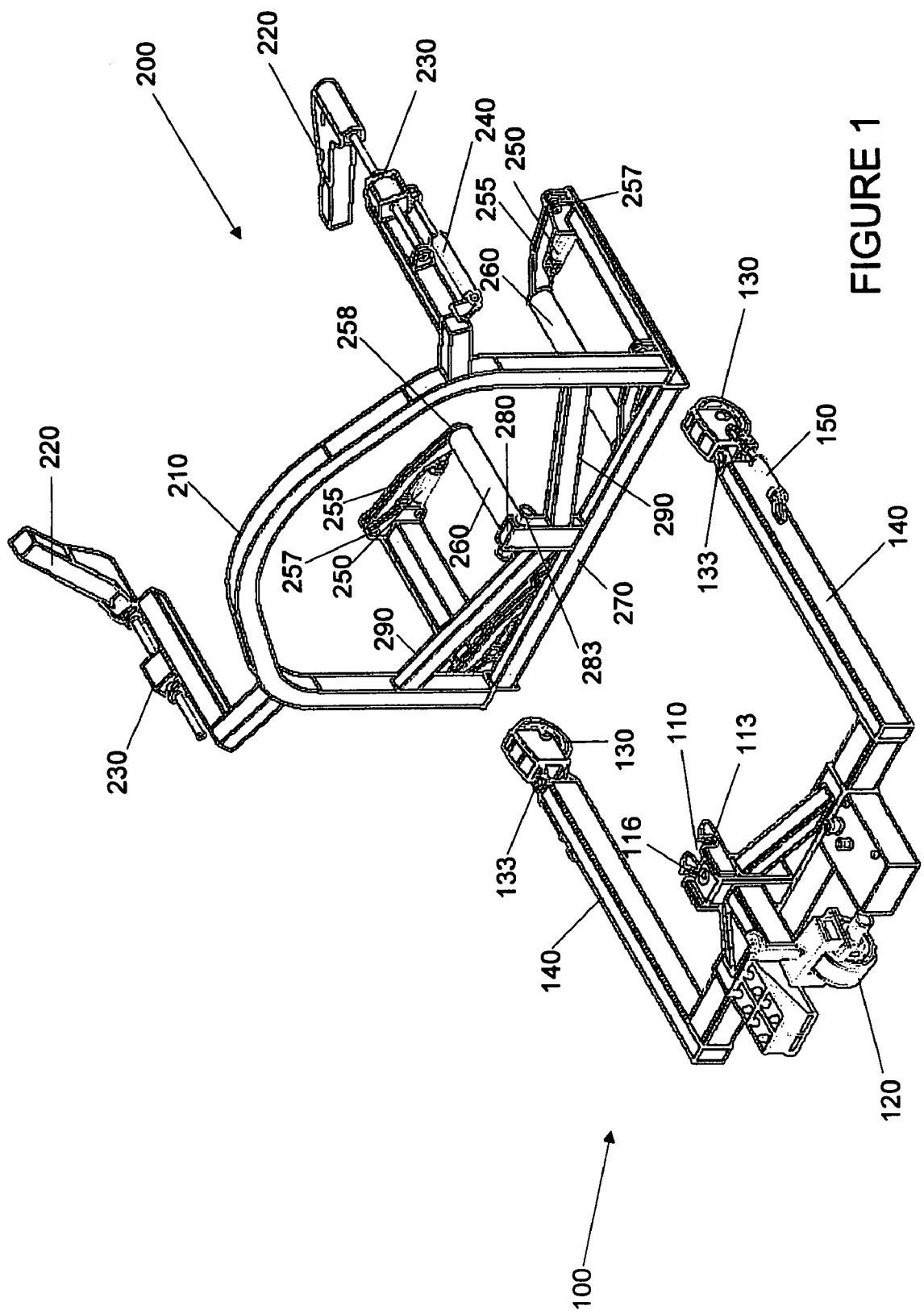
FIG. 1 illustrates an isometric view of an example of the carrier apparatus and a vehicular component handling device coupleable to the carrier apparatus.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Referring now to FIG. 1, there is shown a carrier apparatus 100 and a vehicular component handling device 200. The carrier apparatus 100 is for coupling vehicular interactable equipment such as the vehicular component handling device 200. Other forms of vehicular interactable equipment can be coupled to the carrier apparatus 100, as will be later apparent. The carrier apparatus 100 includes a coupling element 110 to couple the vehicular interactable equipment to the carrier apparatus 100. The carrier apparatus 100 includes a conveyance mechanism 120, 130 to convey the carrier apparatus 100.

The coupling element 110 includes in one form, a recess 113 which engages with lugs provided on the vehicular interactable equipment. The coupling element 110 can include a socket 116 to further facilitate engagement of the vehicular interactable equipment. The socket 116 be in electrical communication to a control unit provided with the carrier apparatus which can provide electrical control signals to the vehicular interactable equipment, such as to control an operation of the vehicular interactable equipment or the carrier apparatus 100.

The carrier apparatus 100 can include actuators 150 to cause rotation of one or more wheels which form the conveyance mechanism 120, 130. In one form, the actuator 150 may be provided as a hydraulic piston and cylinder arrangement which is connected to arms 140 of the carrier apparatus 100, and also to wheels 130. Each wheel is pivotally mounted to an arm 140 of the carrier apparatus 100, such that actuation of the actuator 150 causes the wheel 130 to rotate. In one form, the actuators 150 on each arm 140 of the carrier apparatus 100 operate simultaneously, such as to allow steering of the carrier apparatus 100 over a surface.

As shown in FIG. 1, the conveyance mechanism 120, 130 also includes a rear wheel 120, which is pivotally mounted to the carrier apparatus 100. The rear wheel 120 is located between the arms 140 of the carrier apparatus 100. Due to the pivotal mounting of the rear wheel 120, steering of the carrier apparatus is further facilitated over the surface.

Referring now to the vehicular component handling device 200, it is adapted for receiving a vehicular component during acts of installing, removing and/or changing vehicular components of a vehicle. The vehicular component handling device 200 includes a cavity defined by a support element 210 and at least one movable retaining arm 220, wherein the cavity is able to accommodate the vehicular component. The support element 210 and the at least one movable retaining arm 220, are configured to restrict the vehicular component toppling whilst the vehicular component is accommodated within the cavity. This is particularly advantageous for vehicular components of large vehicles such as those used in the mining industry.

The retaining arms 220 of the vehicular component handling device 200 include a rotational actuator 230 which, when actuated, cause rotational movement of the retaining arms 220, such as to retain or release a vehicular component in or from the cavity. The retaining arm 220 can include an actuator 240 which allows the retaining arm to extend or retract relative to the support element 210. The actuator 240 can be actuated to receive the vehicular component in the cavity and clamp the vehicular component against the support element 210.

The vehicular component handling device 200 includes a movable support member 260 which extends from frame 270. The movable support member 260 is pivotally connected to the frame 270 via actuator 250 and link member 255. The link member 255 and actuator 250 are pivotally connected to the movable support member 260 and frame 270 via pivot points 258 and 257, respectively. When the actuator 250 is actuated, the movable support member 260 moves in an arc-like path where the support member 260 is raised above the surface. By actuating actuators 250, the distance between the support members increases or decreases accordingly, thus altering the cavity for receiving the vehicular component. If a relatively large vehicular component is to be received within the cavity, the actuator 250 can be actuated to increase the distance between support members 260, and also raise the support members 260 relative to the surface such that the large vehicular component can be tight fittingly received within the cavity and also supported above the surface.

Figure 2:
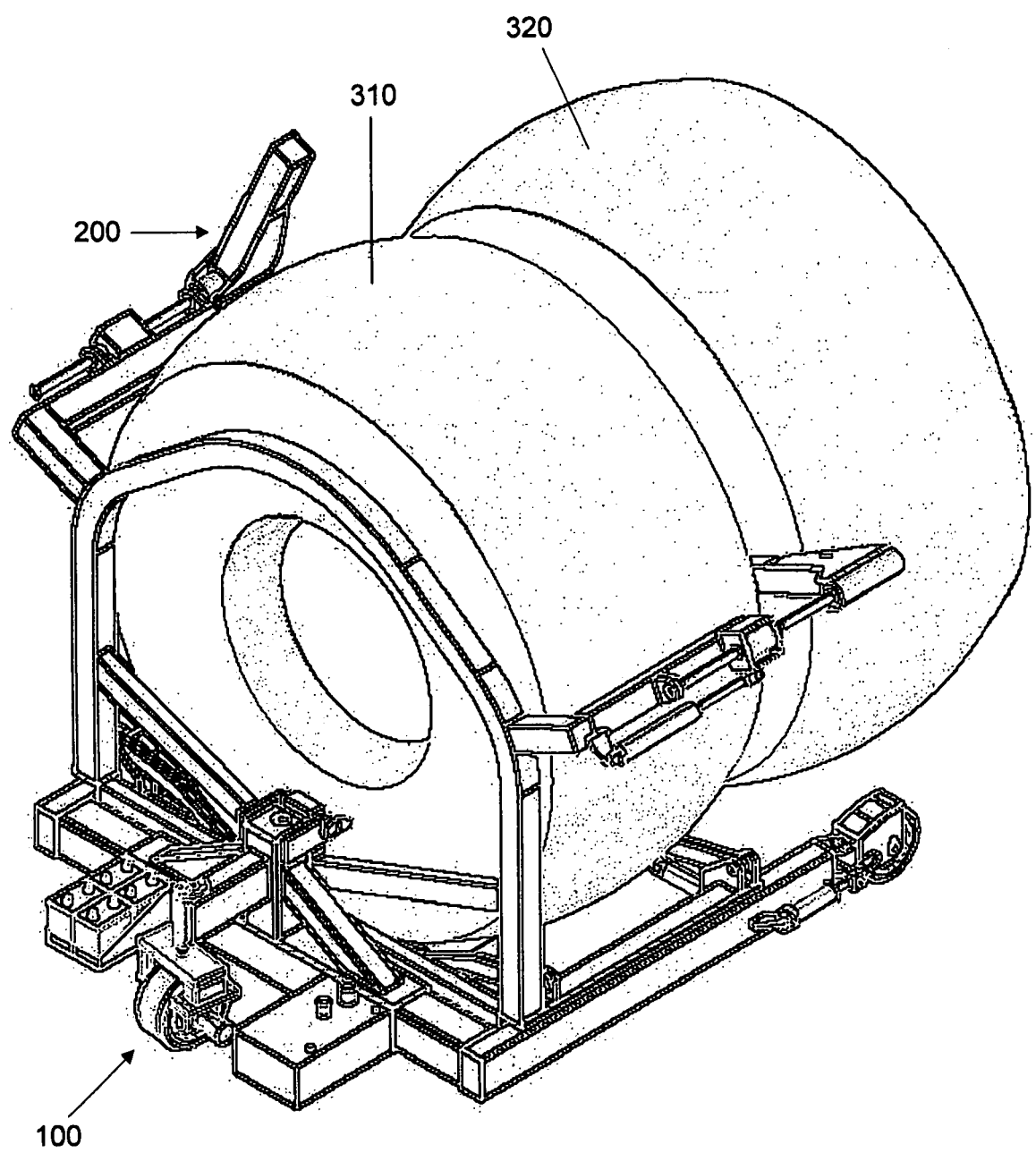
FIG. 2 illustrates an isometric view of the carrier apparatus and vehicular component handling device of FIG. 1 accommodating an exterior vehicular wheel.
Figure 3:
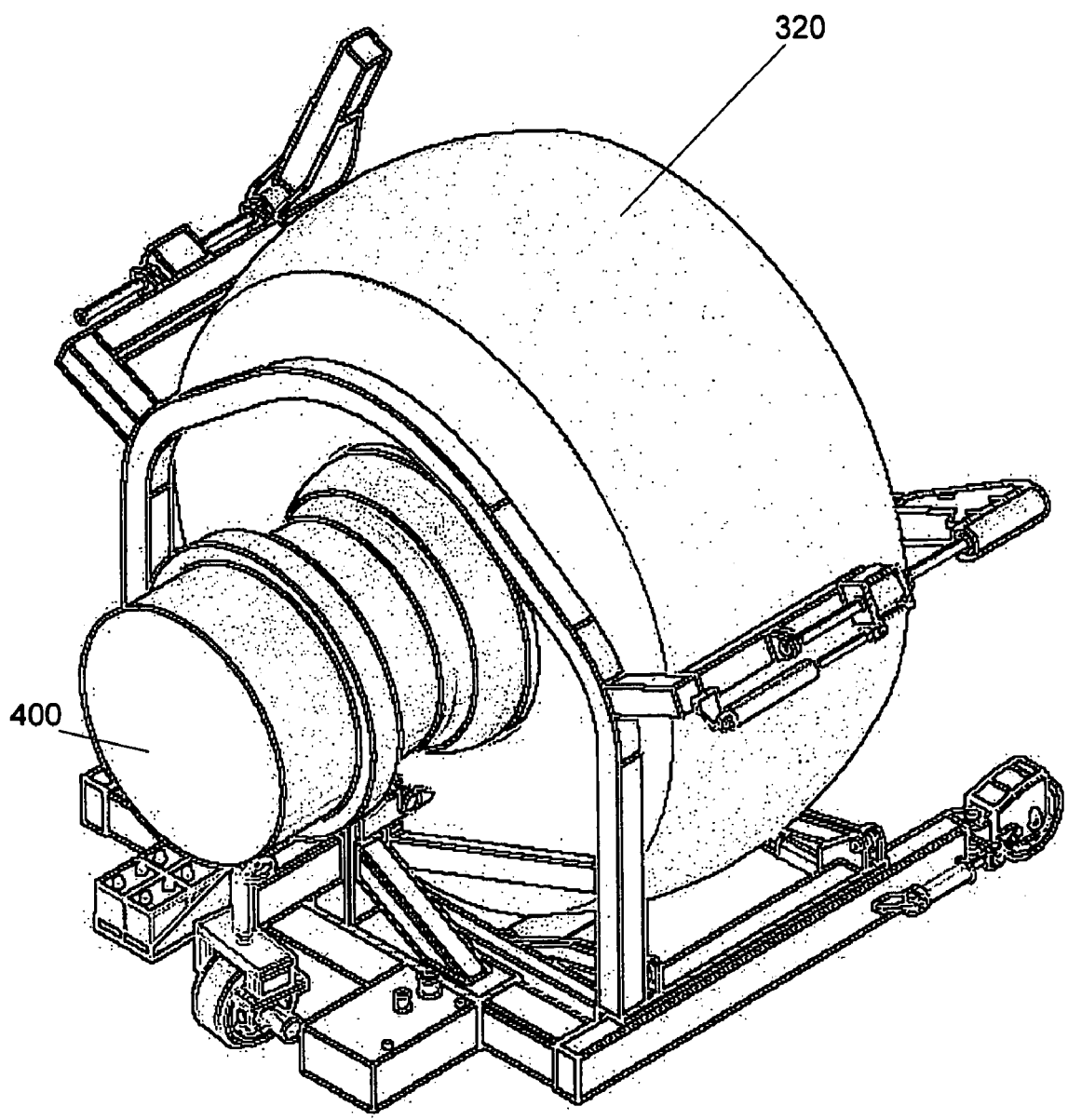
FIG. 3 illustrates an isometric view of the carrier apparatus and vehicular component handling device of FIG. 1 accommodating an interior vehicular wheel.

The vehicular component handling device 200 includes a coupling member 280 which extends from frame 270. The coupling member 280 includes coupling lugs 283, which cooperate with recesses 113 of the carrier apparatus 100, such that the carrier apparatus 100 can manoeuvre the vehicular component handling device 200. The carrier apparatus 100 coupled to the vehicular component handling device 200 is clearly shown in FIG. 2, where the vehicular component handling device 200 receives an exterior vehicular wheel 310. As shown in FIG. 3, the support element and frame 270 define a void which allows an engine 400, associated with an interior wheel 320, to protrude the void, allowing the interior wheel 320 to be accommodated by the cavity of the vehicular component handling device 200.

Figure 4:
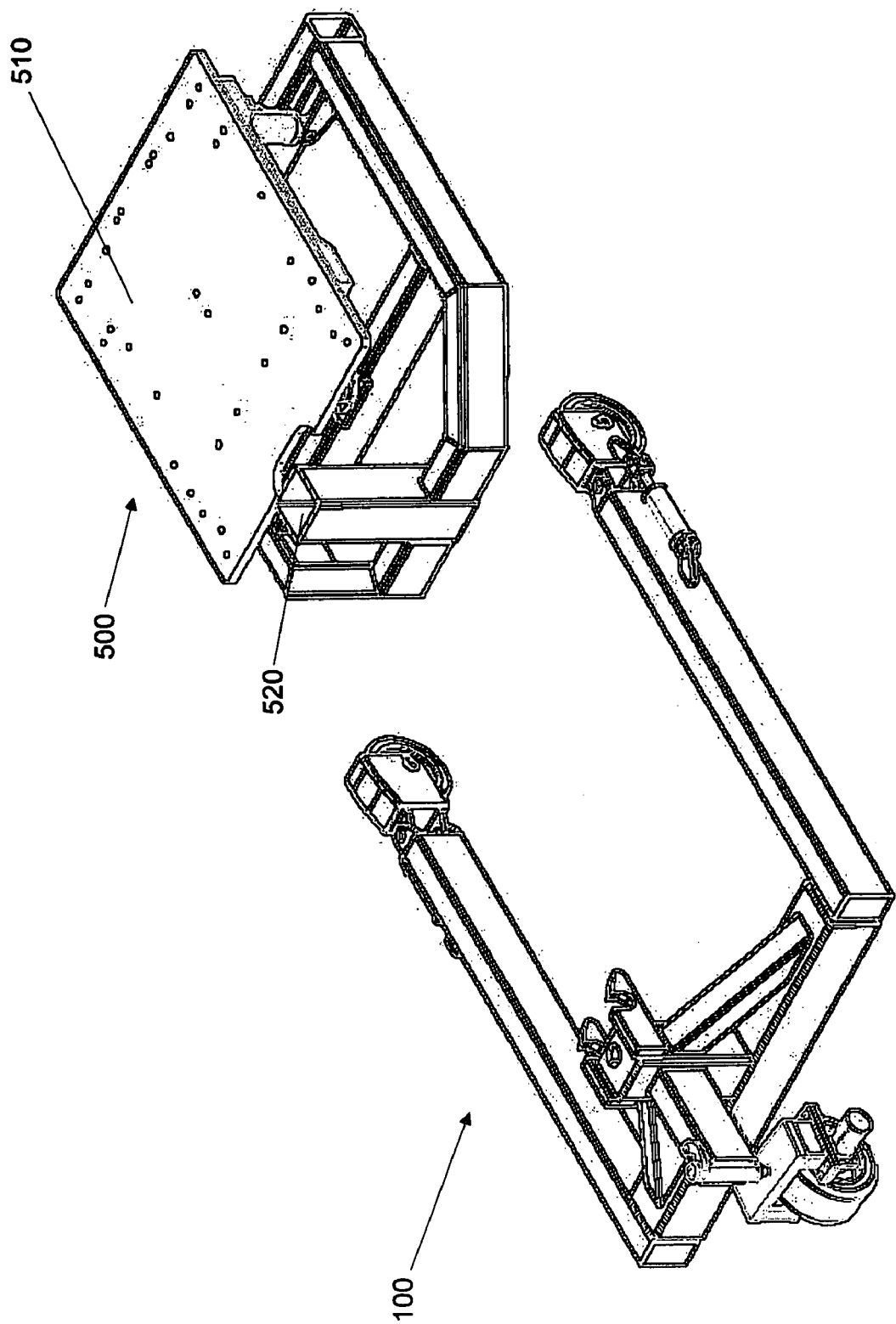
FIG. 4 illustrates an isometric view of the carrier apparatus of FIG. 1 and an example of a workbench which is coupleable to the carrier apparatus.
Figure 5:
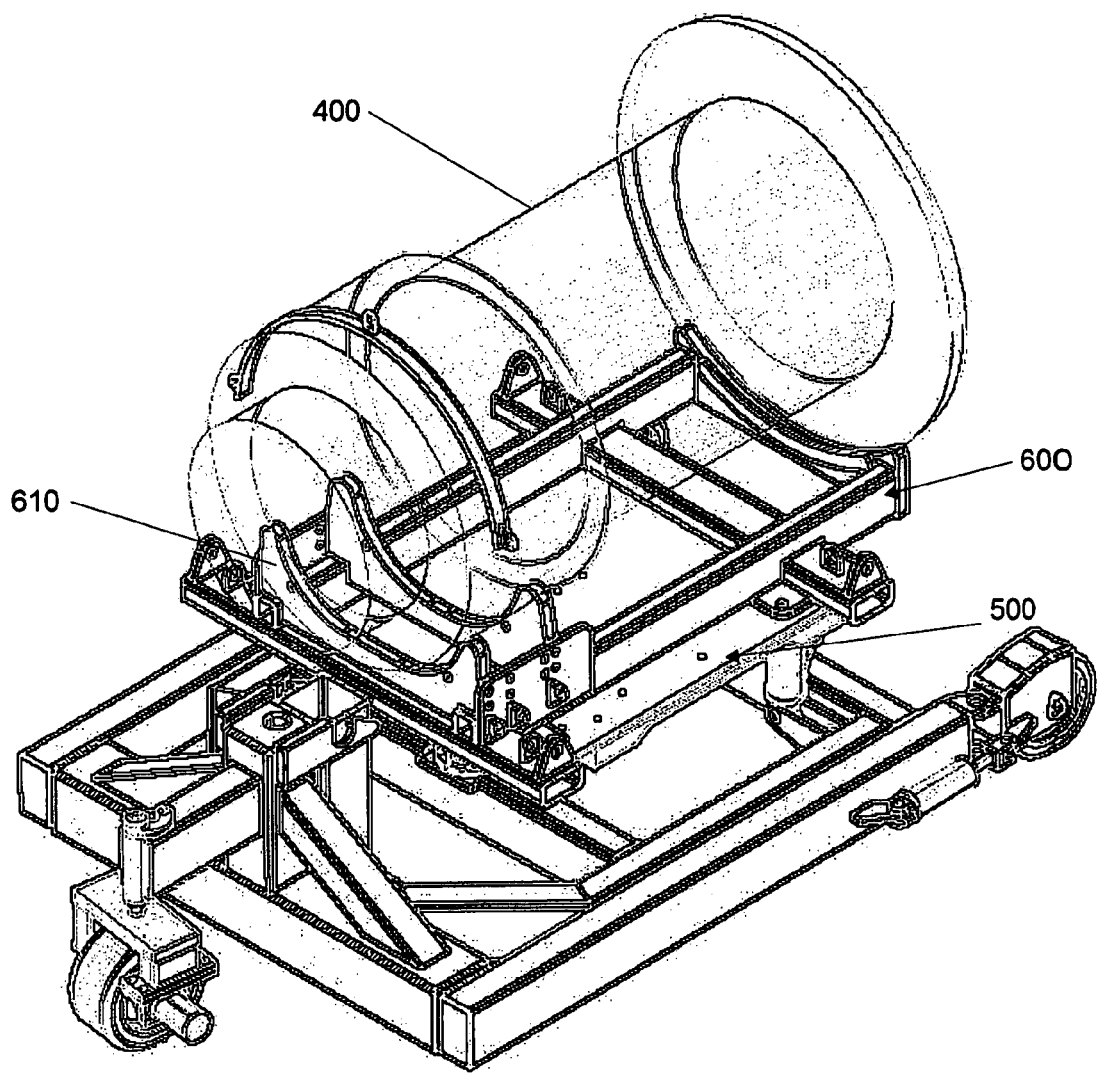
FIG. 5 illustrates an isometric view of the carrier apparatus and workbench of FIG. 4 supporting a vehicular component.

FIG. 4 shows a work bench 500 which can be coupled with carrier apparatus 100. In particular, the work bench 500 includes platform 510 and coupling element 520. As shown in FIG. 5, the work bench 500 is coupled to the carrier apparatus 100, where the carrier apparatus is supporting a cradle 600 and engine 400. The work bench 500 can include attachment means in order to attach the cradle to the work bench 500. The cradle 600 can include support members 610 which are shaped to accommodate the profile of the engine 400.

Figure 6:
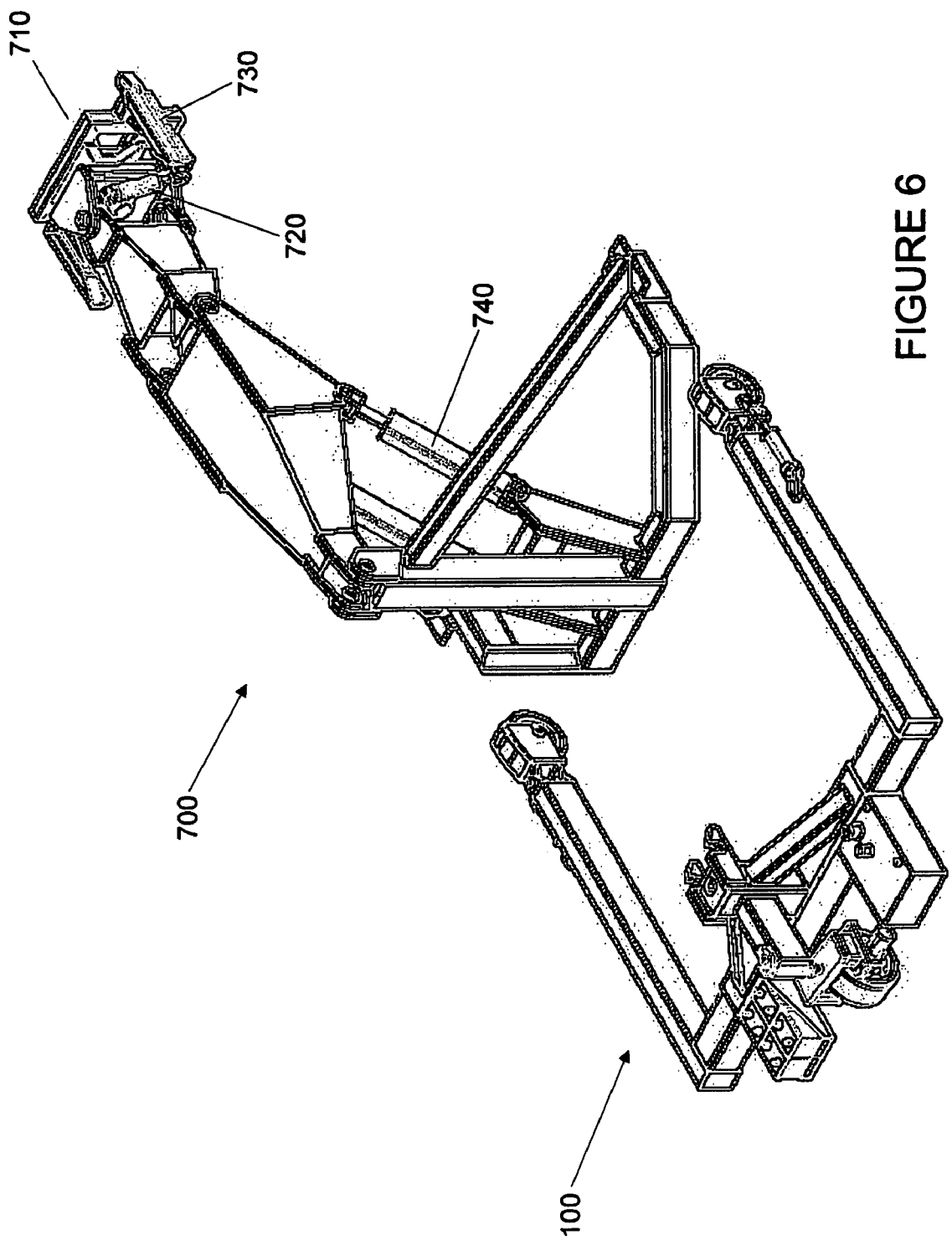
FIG. 6 illustrates an isometric view of the carrier apparatus of FIG. 1 and an example of a jig assembly coupleable to the carrier apparatus.

FIG. 6 shows the carrier apparatus 100 and a jig assembly 700 which can be coupled to the carrier apparatus 100. The jig assembly includes a jig head 710 which is movable in multiple directions via actuation of actuators 720, 730 and 740. Actuation of the actuators 720, 730 and 740 can cause alterations to the pitch, roll and yaw of the jig head, as further explained in the Applicant's application US2002/0150453, which is herein incorporated by cross-reference.

Figure 7:
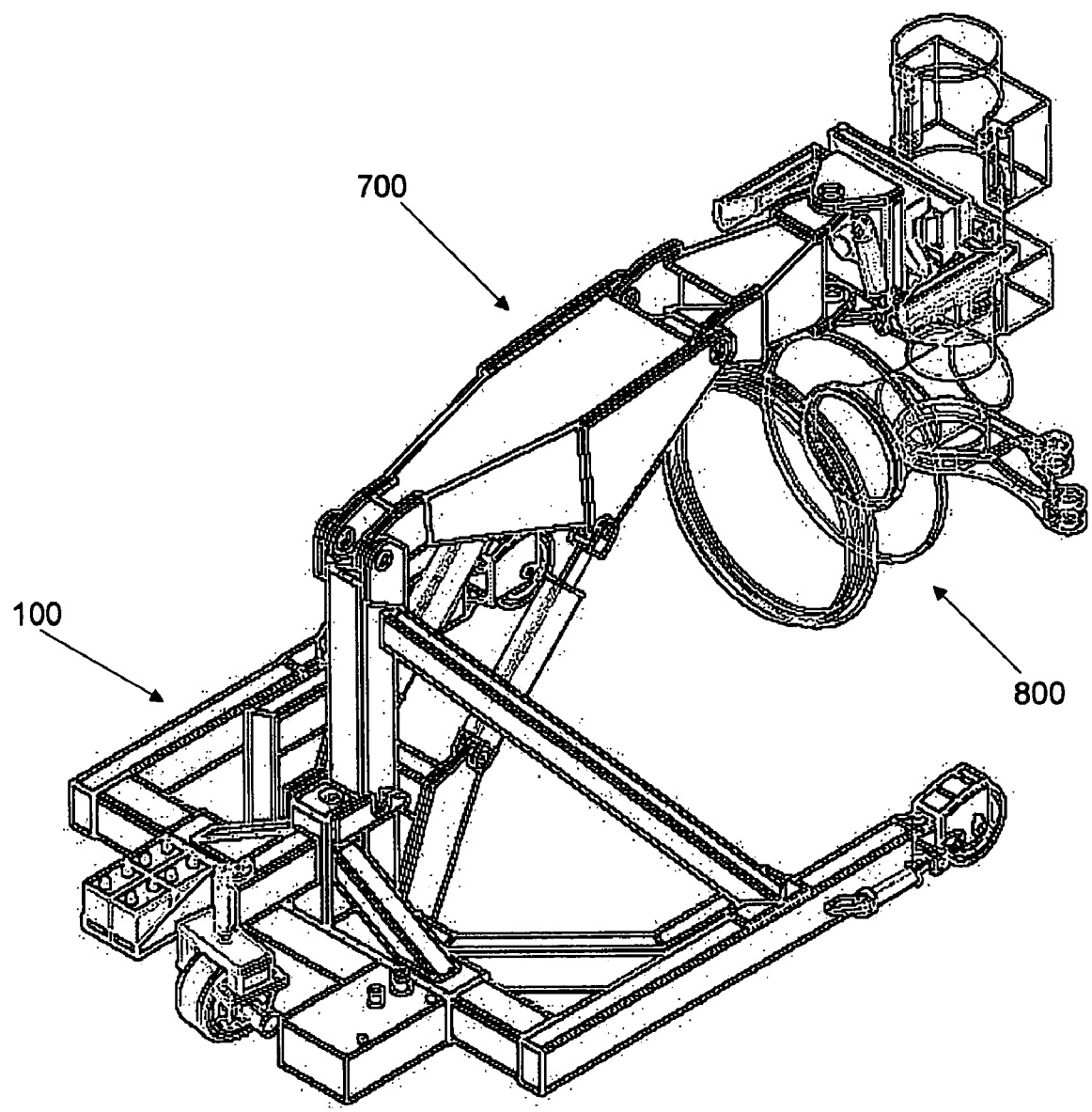
FIG. 7 illustrates an isometric view of the carrier apparatus and jig assembly of FIG. 6 supporting a vehicular component.
Figure 8:
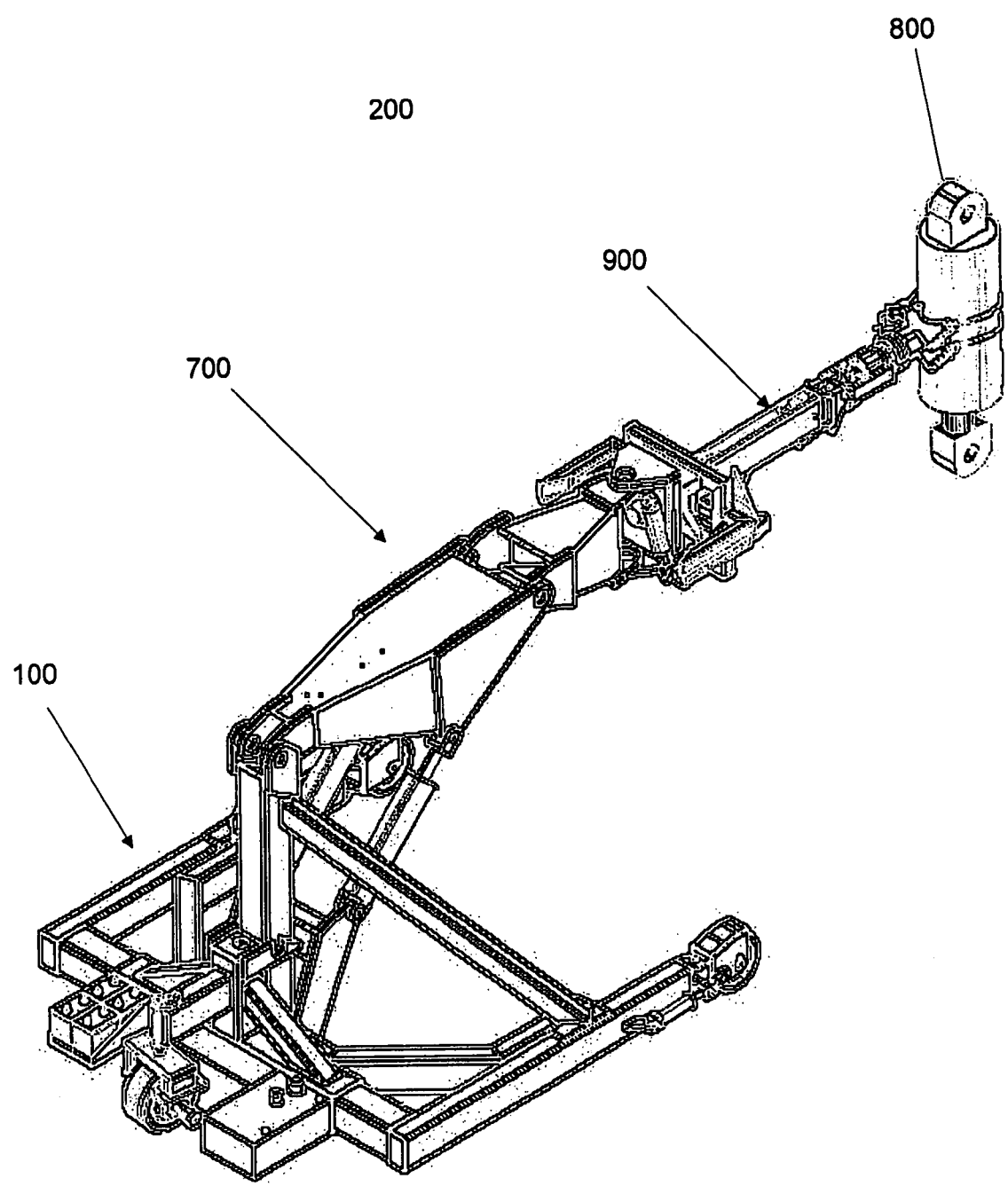
FIG. 8 illustrates an isometric view of the carrier apparatus and jig assembly of FIG. 6 supporting another vehicular component.

FIG. 7 shows the carrier apparatus coupled to the jig assembly 700. The jig assembly 700 can be used to manoeuvre a vehicular component 800 as shown in FIG. 7. FIG. 8 shows the carrier apparatus coupled to the jig assembly 700, where the jig head 710 couples an arm 900 which cooperates with vehicular component 800 such as a manoeuvre the vehicular component 800 into a desired position.

Figure 9:
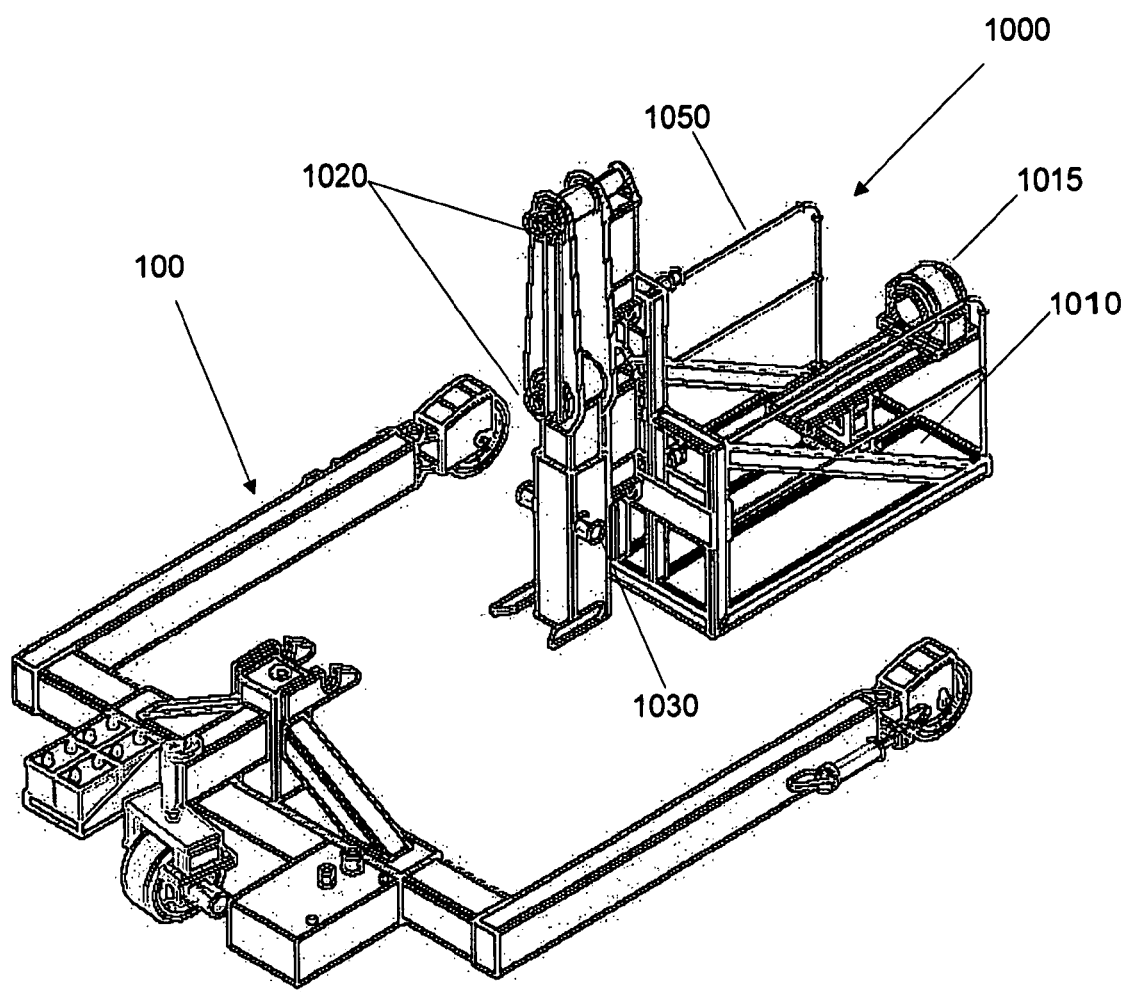
FIG. 9 illustrates an isometric view of the carrier apparatus of FIG. 9 and an example of a positionable station coupleable to the carrier apparatus.

FIG. 9 illustrates the carrier apparatus 100 and a positionable station 1000 which allows interaction with a coupling element 410 of a vehicular component. The positional station 1000 includes a platform 1010 which supports a worktool 1060 which is interactable with the coupling element 410 of the vehicular component. The positionable station 1000 also includes a positioning mechanism 1020 to position the platform 1010 adjacently to the coupling element of the vehicular component, thereby allowing operation of the worktool 1060 with the coupling element of the vehicular component. The positionable station 1000 also includes coupling lugs 1030 which cooperate with recesses 130 of the carrier apparatus 100. The positionable station 1000 can also include guard rails 1050 which extend and surround the platform, such that a user standing on the platform 1010 is restricted from falling off the platform 1010 by the guard rails 1050.

Figure 10:
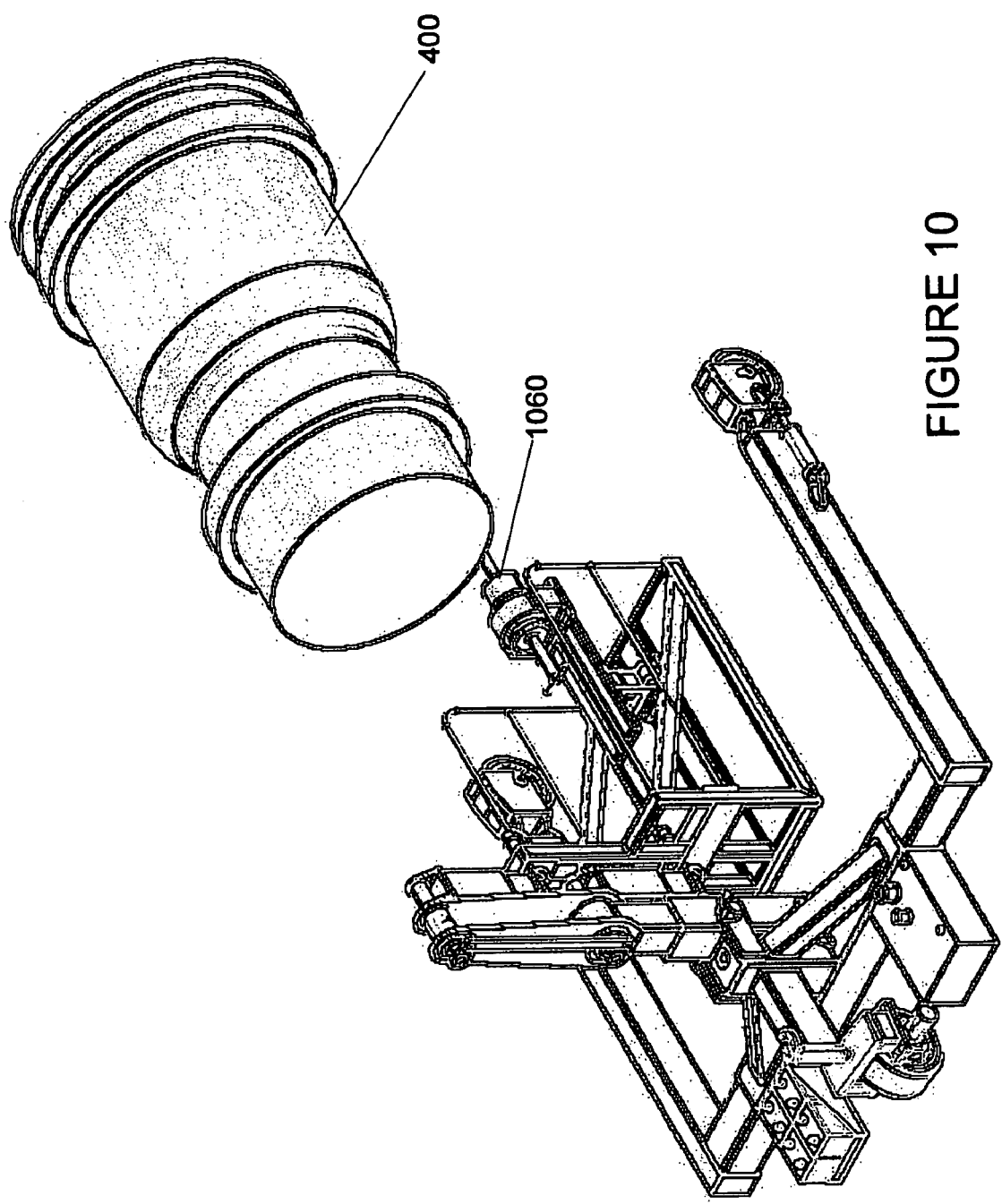
FIG. 10 illustrates an isometric view of the carrier apparatus and the positionable station of FIG. 9 interacting with a vehicular component in a first position.
Figure 11:
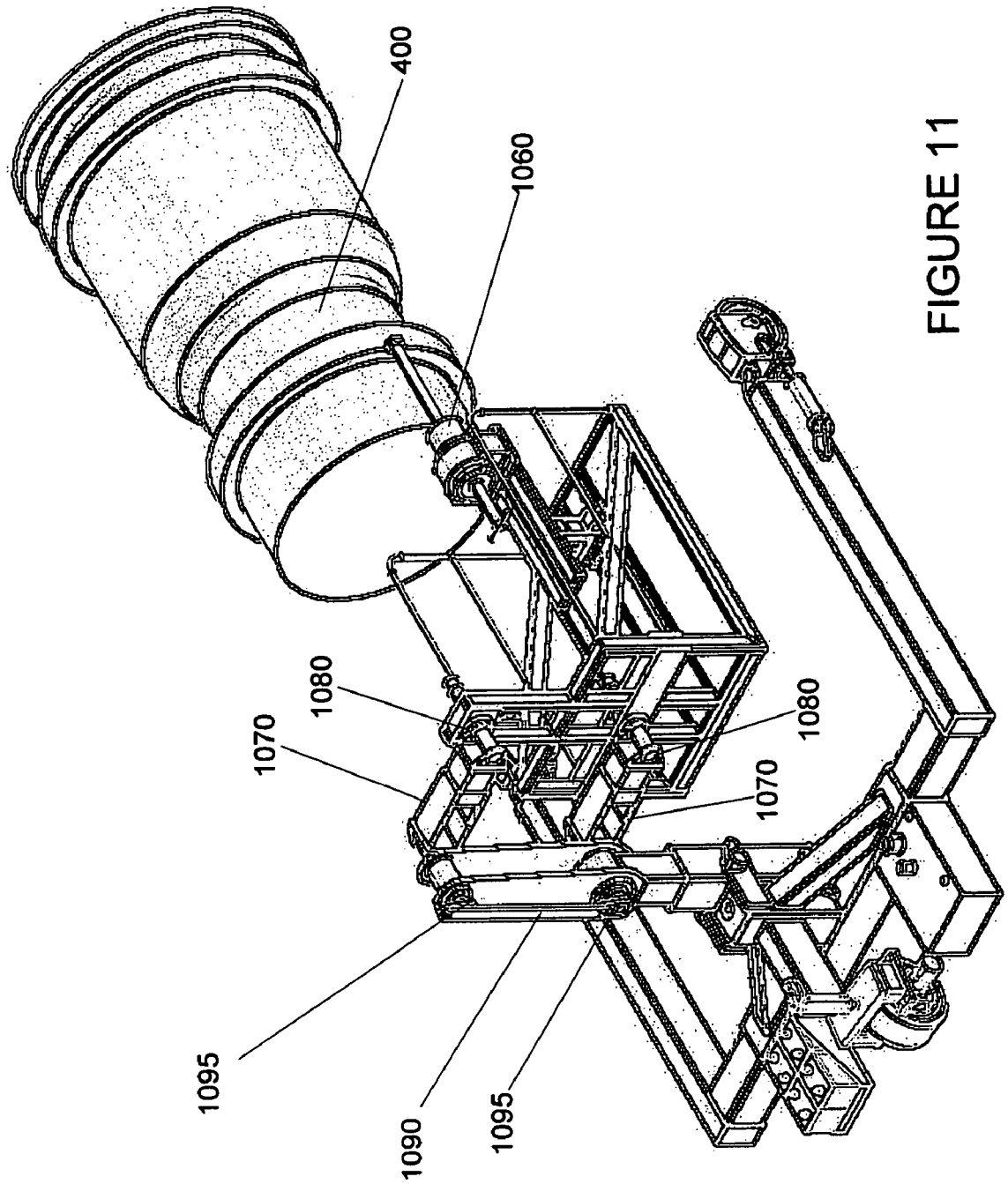
FIG. 11 illustrates an isometric view of the carrier apparatus and the positionable station of FIG. 10 interacting with a vehicular component in a second position.
Figure 12:
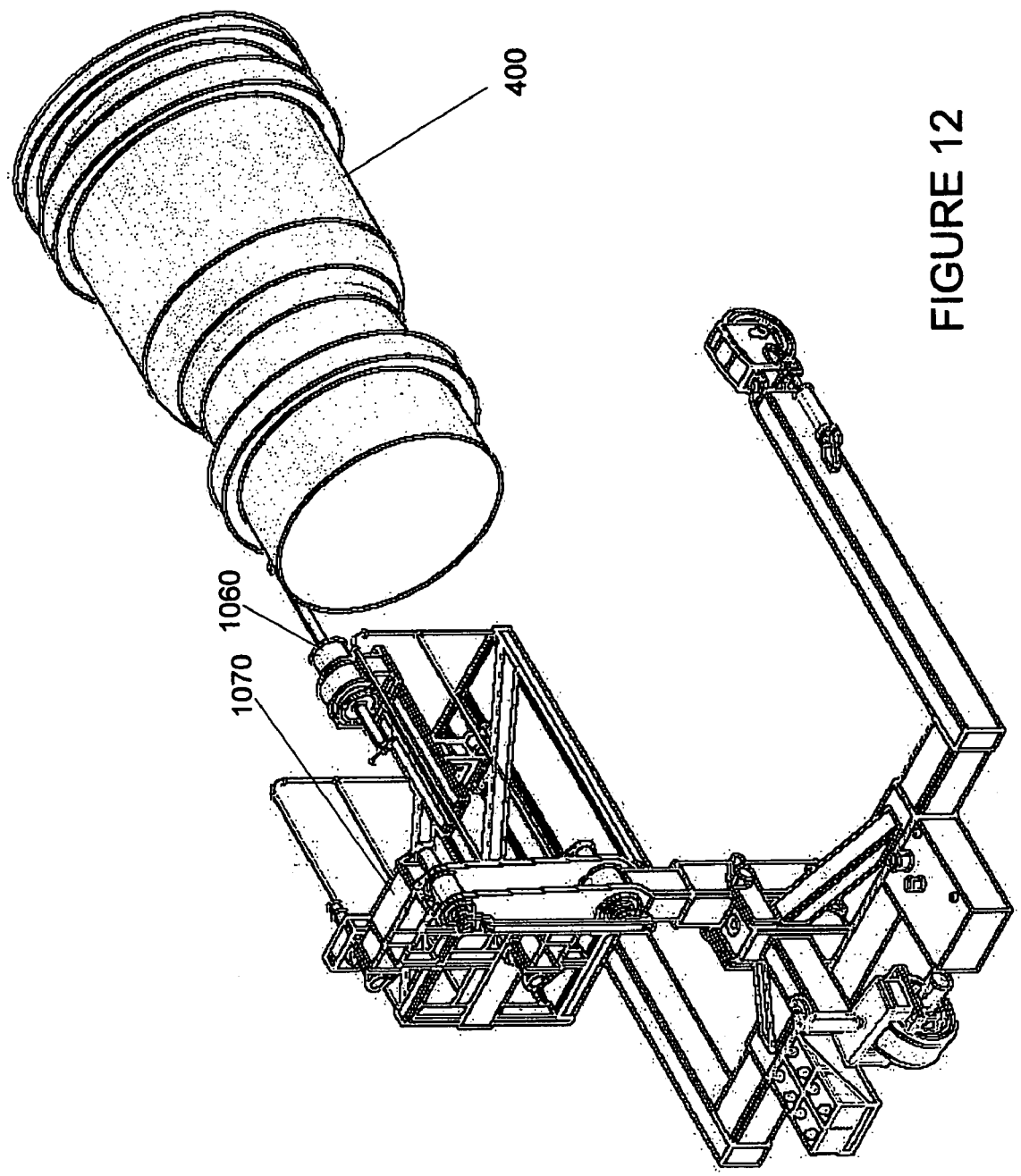
FIG. 12 illustrates an isometric view of the carrier apparatus and the positionable station of FIG. 10 interacting with a vehicular component in a third position; and, FIG. 13 illustrates an isometric view of the carrier apparatus and the positionable station of FIG. 10 interacting with a vehicular component in a fourth position.
Figure 13:
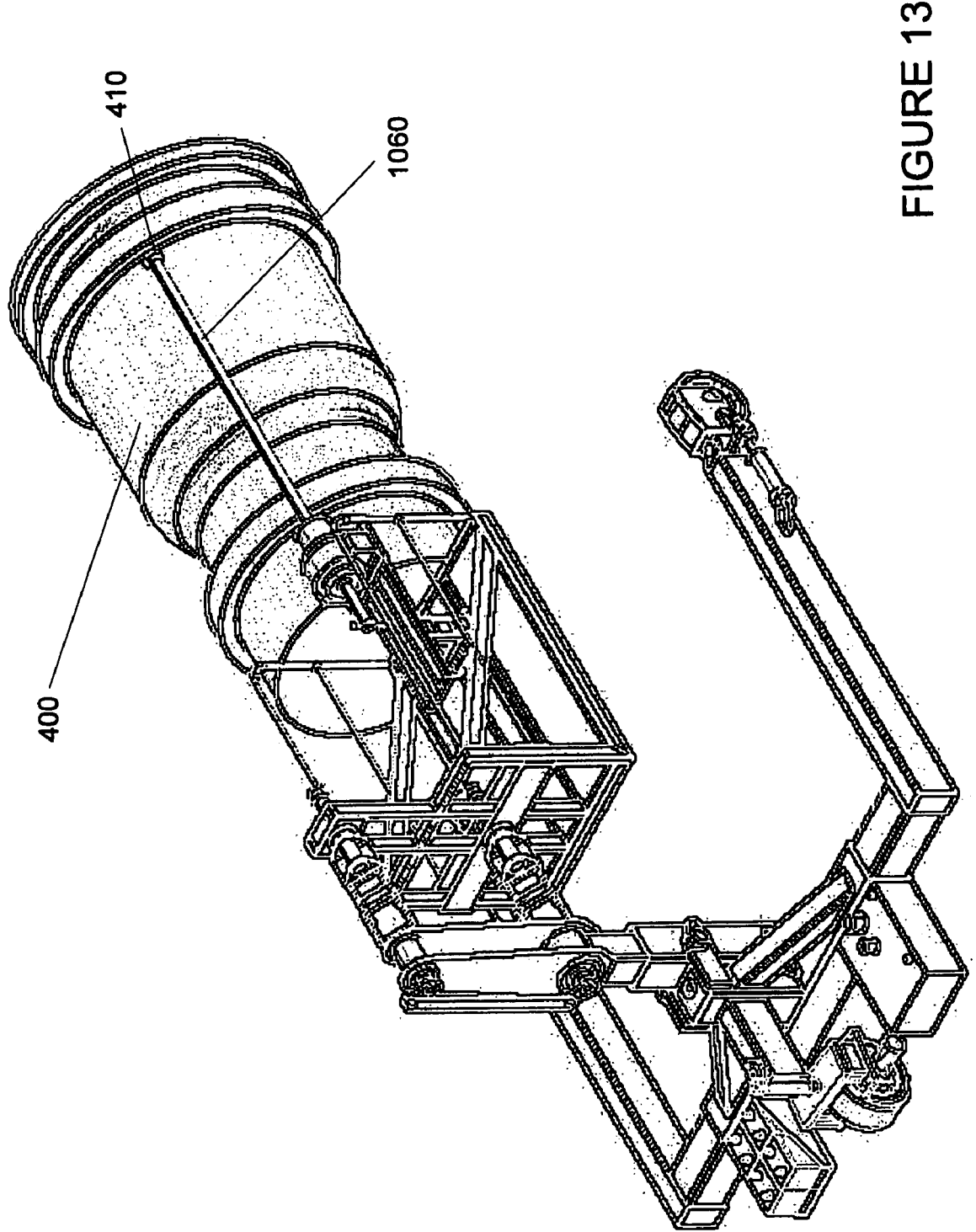

FIG. 10 shows the carrier apparatus coupled to the positionable station 1000. FIG. 10 also shows the worktool 1060 supported by the platform 1010, where the worktool interacts with a vehicular component in the form of an engine 400. In this particular instance, the coupling elements 410 of the vehicular component can be considered nuts. As shown in FIGS. 11, 12 and 13, actuation of the positioning mechanism 1020 causes the platform 1010 and worktool 1060 to move relative to the engine 400. The positioning mechanism as shown in the Figures can include a pair of moveable arms 1070 which extend from the platform 1010 and pivotally connect to a support member 1090.

In one form, the moveable arms 1070 are rotatable. Rotational movement of the arms 1070 cause rotational movement of the platform 1010. Rotational movement of the arms 1070 can be provided by rotational actuators 1095. The rotational actuators 1095 can be controlled by the control unit via the socket 116 of the carrier apparatus 100. The control unit can be programmed to move the platform 1010 in a circular movement around the circumference of the engine 400 such as to position and align the worktool 1060 adjacently to one of the coupling nuts 410 of the vehicular component. The control unit can be programmed to actuate the rotational actuators 1095 so as to rotationally move the platform a predetermined circumferential distance so as to align the worktool 1060 adjacently to one of the nuts 410 of the engine 400. Additionally or alternatively, the user can operate the control unit such as to select a position which the arms 1070 are to move the platform 1010.

The platform 1010 can include a worktool support member 1015 which supports the worktool 1060 from the platform 1010. Generally, the worktool 1060 is relatively large comparatively to normal equipment used for coupling and uncoupling nuts 410 of vehicular components, and as such, the worktool support member 1015 reduces any repetitive strain incurred by a user whilst operating the worktool 1060. As can be seen in FIG. 13, for large engines, the worktool may be relatively long in order to interact with one of the coupling elements of the engine 400. Due to the length of the worktool 1060, a significantly high torque is created which the user must strain against in order to balance and operate the worktool 1060. As such, the worktool support member 1015 reduces the torque which is produced by the significant length of the worktool 1060.

In one form, the worktool support member 1015 is adjustable. The worktool support member 1015 allows for the supported worktool 1060 to move toward and/or away from the engine. This movement can be a slidable movement. The worktool support member 1015 can allow for sideward movement of the worktool 1060. The worktool support member 1015 can also be adjusted in elevation such that the supported worktool 1060 can be adjusted to operate at an adjusted elevation.

In one modification, the positionable station may include an alignment mechanism which, when actuated, aligns a centre point between pivot points 1095 with the centre of the engine 400. In one particular form, the alignment mechanism may include a laser device which is located between pivot points 1095 which projected a laser beam orthogonally to the axis of frame 1090 and outwardly toward the vehicular component 400. By aligning the alignment mechanism with the centre of the vehicular component, actuation of the rotatable arms 1070 can allow the worktool 1060 to adjacently align with multiple coupling elements 410 surrounding the vehicular component 400.

The rotatable arms 1070 may be adjustable in length, such as to accommodate varying sized vehicular components 400. In one form, the arms 1070 may include hydraulic piston and cylinder arrangements such as to allow adjustment of the length of the arms 1070.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the present invention are as follows:

1. An apparatus for removing, installing and servicing a vehicular component of a vehicle, including:

a carrier device to move said apparatus over a substrate surface, said carrier device including:
　a substantially U-shaped chassis having a pair of outwardly extending arms extending from an intermediate spine;
　a wheel provided substantially at the extremity of each arm, and an intermediate wheel positioned below said spine;
　an actuator associated with one or more of said wheels to rotate said respective wheel and thereby effect movement of said carrier device; and
　a coupling element associated with said spine of said carrier device;
a component handling device releasably attached to said carrier device to receive and support said vehicular component, said component handling device including:
　a frame to engage with said chassis of said carrier device and which is adapted to provide support to a portion of said vehicular component; and
　a coupling member to releasably electrically and mechanically couple said component handling device to said spine of said carrier device; and
a control unit to provide control signals to control the operation of said actuator(s) to move said carrier device over said substrate surface and to control movement of said component handling device.

2. An apparatus as claimed in claim 1, wherein operation of said actuator(s) is controlled remotely.

3. An apparatus as claimed in claim 1, wherein each of said coupling element of said carrier device and said coupling member of said component handling device is embodied as a hook, recess or lug.

4. An apparatus as claimed in claim 1, wherein said component handling device further includes:
　a support element extending upwardly from said frame, said support element having at least one retaining arm extending outwardly therefrom which is adapted to provide support to an upper portion of said vehicular component, wherein said frame, said support element and said at least one retaining arm define a cavity which is able to accommodate said vehicular component.

5. An apparatus as claimed in claim 4, wherein said frame includes a pair of outwardly extending support members each of which are adapted to provide support to either side of a lower portion of said vehicular component.

6. An apparatus as claimed in claim 5, wherein said vehicular component is a wheel.

7. An apparatus as claimed in claim 6, wherein said support members each include a roller thereon, such that when said wheel is held in said apparatus, said wheel may be rotated on said rollers within said component handling apparatus.

8. An apparatus as claimed in claim 4, wherein said support element includes a pair of retaining arm(s), each of which is adapted to provide support to either side of an upper portion of said vehicular component.

9. An apparatus as claimed in claim 8, wherein each of said retaining arms includes an upper and outer arm portion, at least the outer arm portion being operably movable to be capable of grasping said vehicular component.

10. An apparatus as claimed in claim 1, wherein said actuator(s) are hydraulic or electrical.

11. An apparatus as claimed in claim 1, wherein said component handling device includes:
　a positionable station associated with said frame and having a platform adapted to support a work tool; and
　a positioning mechanism associated with said frame to position said platform to thereby enable operation of said work tool with said vehicular component.

12. An apparatus as claimed in claim 11, wherein said positioning mechanism includes at least one of a hydraulic ram and an electric motor.

13. An apparatus as claimed in claim 11, further including a cradle provided on said platform, said cradle adapted to receive a motor or other vehicular component.

14. An apparatus as claimed in claim 11, wherein said platform is provided with handrails and adapted to support an operator.

15. An apparatus as claimed in claim 1, wherein said component handling device is embodied as a jig assembly and includes a jig head, operable by at least one actuator.

16. An apparatus as claimed in claim 1, wherein said coupling element of said carrier device includes a socket to further facilitate engagement of said carrier device with said component handling device, said socket being in electrical communication with said control unit.

17. An apparatus as claimed in claim 16, wherein said coupling member of said component handling device includes a lug for coupling with said coupling element of said carrier device, and wherein said coupling element of said carrier device includes a recess for engaging with said lug of said coupling member of said component handling device.

18. An apparatus for removing, installing and servicing a vehicular component of a vehicle, including:
　a carrier device to move said apparatus over a substrate surface, said carrier device including:
　　a chassis having a pair of outwardly extending arms extending from an intermediate spine;
　　at least one wheel attached to said chassis;
　　an actuator associated with said wheel to rotate said wheel and thereby effect movement of said carrier device; and
　　a coupling element associated with said spine of said carrier device;
　a component handling device releasably attached to said carrier device to receive and support said vehicular component, said component handling device including:
　　a frame to engage with said chassis of said carrier device and which is adapted to provide support to said vehicular component;
　　a support element extending upwardly from said frame, said support element having at least one retaining arm extending outwardly therefrom which is adapted to provide support to an upper portion of said vehicular component, wherein said frame, said support element and said at least one retaining arm define a cavity which is able to accommodate said vehicular component; and
　　a coupling member to releasably electrically and mechanically couple said component handling device to said carrier device; and
　a control unit to provide control signals to control the operation of said actuator(s) to move said carrier device over said substrate surface and to control movement of said component handling device.

19. An apparatus as claimed in claim 18, wherein said chassis includes a wheel provided substantially at the extremity of each arm, and an intermediate wheel positioned below said spine.

20. An apparatus as claimed in claim 19, wherein said frame includes a pair of outwardly extending support members each of which are adapted to provide support to either side of a lower portion of said vehicular component.

21. An apparatus as claimed in claim 19, wherein said support element includes a pair of retaining arms, each of which is adapted to provide support to either side of an upper portion of said vehicular component.

22. An apparatus as claimed in claim 21, wherein each of said retaining anus includes an upper and outer arm portion, at least the outer arm portion being operably movable to be capable of grasping said vehicular component.

23. An apparatus as claimed in claim 19, wherein said coupling element of said carrier device includes a socket to further facilitate engagement of said carrier device with said component handling device, said socket being in electrical communication with said control unit.

24. An apparatus as claimed in claim 23, wherein said coupling member of said component handling device includes a lug for coupling with said coupling element of said carrier device, and wherein said coupling element of said carrier device includes a recess for engaging with said lug of said coupling member of said component handling device.

25. An apparatus for removing, installing and servicing a vehicular component of a vehicle, including:
   a carrier device to move said apparatus over a substrate surface, said carrier device including:
      a chassis having a pair of outwardly extending arms extending from an intermediate spine;
      at least one wheel attached to said chassis;
      an actuator associated with said wheels to rotate said wheel and thereby effect movement of said carrier device; and
      a coupling element associated with said spine of said carrier device;
   a component handling device releasably attached to said carrier device to receive and support said vehicular component, said component handling device including:
      a frame to engage with said chassis of said carrier device and which is adapted to provide support to said vehicular component;
      a positionable station associated with said frame and having a platform adapted to support a work tool;
      a positioning mechanism associated with said frame to position said platform to thereby enable operation of said work tool with said vehicular component; and
      a coupling member to releasably electrically and mechanically couple said component handling device to said spine of said carrier device; and
   a control unit to provide control signals to control the operation of said actuator(s) to move said carrier device over said substrate surface and to control movement of said component handling device.

26. An apparatus as claimed in claim 25, wherein said positioning mechanism includes at least one of a hydraulic ram and an electric motor.

27. An apparatus as claimed in claim 25, further including a cradle provided on said platform, said cradle adapted to receive a motor or other vehicular component.

28. An apparatus as claimed in claim 25, wherein said platform is provided with hand rails and adapted to support an operator.

29. An apparatus as claimed in claim 25, wherein said coupling element of said carrier device includes a socket to further facilitate engagement of said carrier device with said component handling device, said socket being in electrical communication with said control unit.

30. An apparatus for removing, installing and servicing a vehicular component of a vehicle, including:
   a carrier device to move said apparatus over a substrate surface, said carrier device including:
      a chassis having a pair of outwardly extending arms extending from an intermediate spine;
      at least one wheel attached to said chassis;
      an actuator associated with said wheel to rotate said wheel and thereby effect movement of said carrier device; and
      a coupling element associated with said spine of said carrier device;
   a component handling device releasably attached to said carrier device to receive and support said vehicular component, said component handling device including:
      a frame to engage with said chassis of said carrier device and which is adapted to provide support to a portion of said vehicular component;
      a jig head, operable by at least one actuator; and
      a coupling member to releasably electrically and mechanically couple said component handling device to said spine of said carrier device; and
   a control unit to provide control signals to control the operation of said actuator(s) to move said carrier device over said substrate surface and to control movement of said component handling device.

31. An apparatus as claimed in claim 30, wherein said coupling element of said carrier device includes a socket to further facilitate engagement of said carrier device with said component handling device, said socket being in electrical communication with said control unit.

32. An apparatus as claimed in claim 31, wherein said coupling member of said component handling device includes a lug for coupling with said coupling element of said carrier device, and wherein said coupling element of said carrier device includes a recess for engaging with said lug of said coupling member of said component handling device.

* * * * *